United States Patent [19]

Kim

[11] Patent Number: 4,683,512

[45] Date of Patent: Jul. 28, 1987

[54] DEVICE FOR VARIABLY ADJUSTING A MOMENT OF INERTIA OF A DRUM OF A VIDEOCASSETTE RECORDER

[75] Inventor: Soo K. Kim, Kyungki, Rep. of Korea

[73] Assignee: Gold Star Co., Ltd., Seoul, Rep. of Korea

[21] Appl. No.: 883,267

[22] Filed: Jul. 8, 1986

[30] Foreign Application Priority Data

Jul. 8, 1985 [KR] Rep. of Korea ................. 4873/1985

[51] Int. Cl.[4] ............................................. G11B 00/00
[52] U.S. Cl. ................................... 360/137; 360/107; 310/74
[58] Field of Search .................. 360/137, 107; 310/74

[56] References Cited

U.S. PATENT DOCUMENTS 3,545,301 12/1970 Richter .............................. 310/74 X Primary Examiner—John H. Wolff
Attorney, Agent, or Firm—Cushman, Darby & Cushman

[57] ABSTRACT

A device for variably adjusting a moment of inertia of a drum of a videocassette recorder. The device comprises a plurality of inertial masses adapted to add a variable increment of a moment of inertia to a moment of inertia of the drum. In virtue of the possibility of varying the moment of inertia of the drum, it is possible to check the frame condition of the recorder, and thus, to obtain an optimum frame condition.

1 Claim, 6 Drawing Figures

DEVICE FOR VARIABLY ADJUSTING A MOMENT OF INERTIA OF A DRUM OF A VIDEOCASSETTE RECORDER

BACKGROUND OF THE INVENTION

The present invention relates to a drum of a videocassette recorder, and particularly to a device for variably adjusting a moment of inertia of a drum of a videocassette recorder, in order to obtain an optium frame condition of the recorder.

Generally, one of important factors in designing a videocassette recorder (hereinafter, referred to as a VCR) is to determine a moment of inertia of rotating part of a drum of the recorder. A video head attached to the drum is periodically subjected to an impact pulse every 1/60 second in the case of NTSC mode and every 1/50 second in the case of PAL mode. In designing the rotating part of the drum, therefore, an inherent frequency of torsional vibration of the drum has to be determined such that it does not coincide with a frequency of an integral multiple of 60 Hz in the NTSC mode or 50 Hz in the PAL mode, and that the effect of high frequency of the impact pulse is minimized. The inherent frequency of torsional vibration of the drum is dependent upon an inertia moment of the rotating part of the drum. Eventually, determining the inertia moment of the drum is an important design factor.

Generally, the rotating part of the drum include a flange carrying an upper drum supporting a video head, said flange disposed at the upper portion of a rotating shaft of the drum, a motor driving said rotating shaft, and a ring collar connecting said motor and said rotating shaft, said motor and ring collar disposed at the lower portion of said rotating shaft. Such inherent frequency of the torsional vibration of the drum, denoted by "fn", is expressed by the following equation.

$$fn = \tfrac{1}{2}\pi \sqrt{K \times I_1 + I_2/I_1 \times I_2} \qquad (1)$$

wherein, $I_1$: a moment of inertia of the upper rotary drum and the flange,
$I_2$: a moment of inertia of the rotor of the motor and the ring collar, and
K : a constant determined by the rotary shaft and expressed by the following equation.

$$K = \pi G d^4 / 32\, l \qquad (2)$$

wherein,

G: a modulus of shear,
d: a diameter of the rotating shaft, and
l: an effective length of the rotating shaft.

As apparent from the equation (1), the inherent frequency fn of the drum is fixed, if the moments of inertia $I_1$ and $I_2$ are determined. In the prior art, accordingly, it is impossible to check or test the frame condition of the VCR variable depending upon the inherent frequency of the drum, that is, the inertia moment of the rotating part of the drum, unless a new drum is used in order to vary the moment of inertia.

SUMMARY OF THE INVENTION

Therefore, an object of the present invention is to eliminate the above-mentioned disadvantage encountered in the prior art, and thus, to provide a device for variably adjusting a moment of inertia of a VCR drum to provide the optimum frame condition of the VCR.

In accordance with the present invention, this object is accomplished by providing a device for variably adjusting a moment of inertia of a drum of a videocassette recorder, said drum including upper and lower drums mounted to a rotating shaft coupled at lower end thereof to a motor, the device comprising:

a disc-shaped plate fixedly mounted to a rotor of said motor; a plurality of protrusions radially arranged at concentric circles on said plate, said circles being spaced at different radial distances from the center of said rotating shaft; respectively; a plurality of inertial masses separably coupled to selected protrusions, respectively; and a plurality of springs each connecting adjacent inertial masses, adjusted depending upon the selective coupling of said inertial masses to selected protrusions of said plate.

When an inertial mass is added to the rotating part of the drum, as above-mentioned, an increment of inertia moment $\Delta I_2$ generated by the inertial mass is added to the moment of inertia $I_2$ of the rotating part of the drum. Accordingly, an inherent frequency fn of the torsional vibration of the drum is expressed by the following equation.

$$fn = \tfrac{1}{2}\pi \sqrt{K \cdot I_1 + I_2 + \Delta I_2/I_1 \cdot (I_2 + \Delta I_2)} \qquad (3)$$

In the equation (3), the increment of inertia moment $\Delta I_2$ is derived from the following equation.

$$\Delta I_2 = \sum_{i=1}^{n} (Iio + MiRi^2) \qquad (4)$$

where, n: the number of inertia masses,
Iio: the inertia moment of the inertia mass itself added for the n-th time,
Mi: the mass added for the n-th time, and
Ri: the distance of the mass added for the n-th time from the center of the rotating shaft.

In accordance with the present invention, therefore, the inherent frequency fn of the drum can be variously changed as apparent from the equations 3 and 4. In virtue of the possibility of varying the inherent frequency, it is possible to check the frame condition of the VCR variable depending thereupon, and thus, to variably adjust the moment of inertia of the drum in order to obtain an optimum frame condition.

Other objects and advantages of the present invention will be apparent to those skilled in the art to which the invention relates from the following detailed description of preferred embodiments of the invention made with reference to the accompanying drawings.

DETAILED DESCRIPTION OF THE PREFERRED EMBODIMENT

Figure 1:
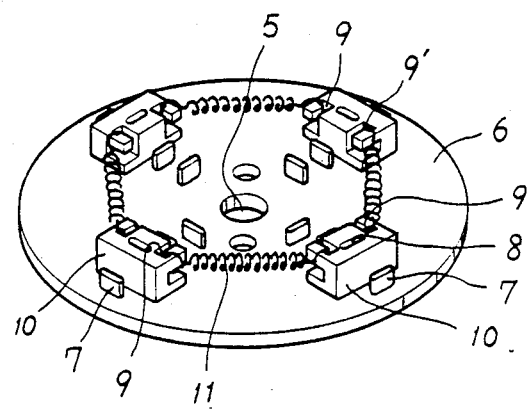
FIG. 1 is a perspective view of a device in accordance with the present invention.
Figure 2:
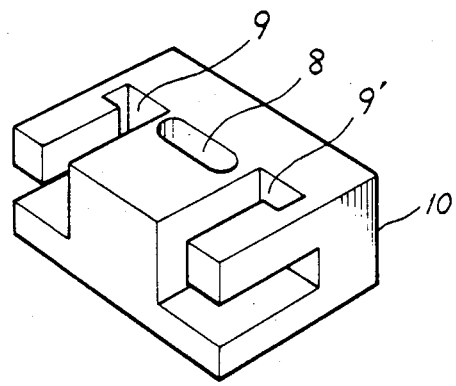
FIG. 2 is a perspective view of an inertial mass in accordance with the present invention.
Figure 3:
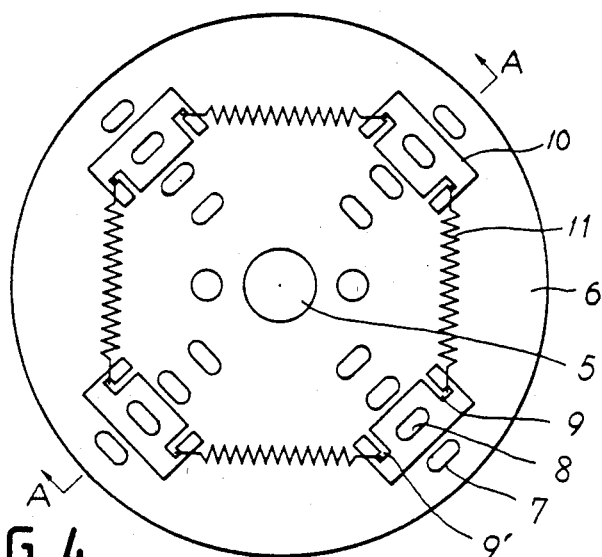
FIG. 3 is a plan view of a device shown in FIG. 1.
Figure 4:
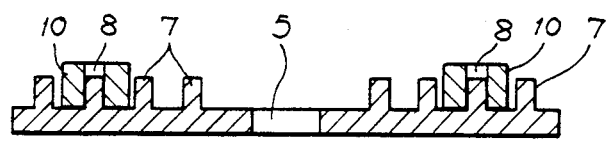
FIG. 4 is a cross-sectional view taken along the lines A—A in FIG. 3.
Figure 5:
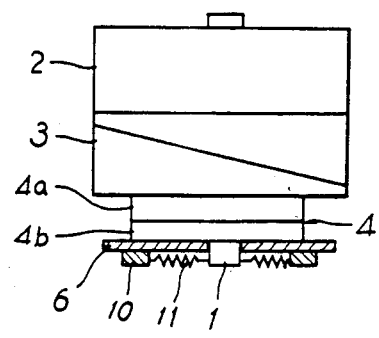
FIG. 5 is a schematic view showing a device of the present invention mounted to a drum of a VCR.

FIG. 1 shows a device for variably adjusting a moment of inertia in accordance with the present invention. The device is applied to a VCR drum which includes a rotary drum 2 and a stationary drum 3 supported to upper and lower portions of a rotating shaft 1, as shown in FIG. 5. Below the lower stationary drum 3, a motor 4 comprising a stator 4a and a rotor 4b is disposed. As the motor 4 drives, the rotor 4b, the rotating shaft 2, and the rotary drum 2 are rotated together. The device of the present invention is fixedly mounted to the rotor 4b of the motor 4 to rotate therewith, as shown in FIG. 5. The device of the present invention comprises a disc-shaped plate 6 fixedly mounted to the rotor 4b of the motor 4 and provided at the center portion thereof with a hole 5 for receiving the shaft 1 of the drum, as shown in FIG. 1. At one surface of the disc-shaped plate 6 opposite to the surface faced to the motor 4, a plurality of protrusions 7 are formed to vertically extend from said surface of the plate 6. The protrusions 7 are radially arranged at concentric circles respectively spaced at different diatances from the center of the plate 6. The device of the present invention also comprises a plurality of inertia masses 10 separably coupled to selected protrusions 7, and a plurality of springs 11 connecting adjacent inertial masses 10. Each inertial mass 10 has at the middle portion thereof a hole 8 for receiving the protrusion 7 and at both side portions thereof a pair of grooves 9 and 9' receiving respective opposite ends of adjacent springs. In the embodiment of the present invention shown in FIG. 1, four protrusions 7 are arranged at each concentric circle and spaced at an angle of 90° from one another. And also, four inertial masses are disposed at the plate 6. Of course, the number and the arrangement of the protrusions 7 and the number of the inertial masses 10 may be varied, if desired.

Figure 6:
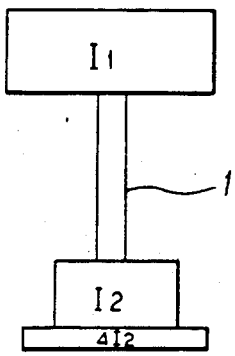
FIG. 6 is a schematic view explaining inertia moments of the rotating parts of the drum to which the present invention is applied.

FIG. 6 is an explanation of a moment of inertia of the rotating part of the drum to which the present invention is applied. In the drawing, $I_1$ denotes a moment of inertia of the upper drum 2 and a flange (not shown), $I_2$ a moment of inertia of the rotor 4b of the motor 4 and a ring collar (not shown), and $\Delta I_2$ an increment of a moment of inertia according to the present invention.

Where the device of the present invention including four inertial masses 10 is mounted to the motor 4, an inherent frequency fn varied depending upon the variation of the inertia moment of the drum is derived from the above-mentioned equation (3). In the equation (3), an increment of a moment of inertia is derived from the following equation 4'.

$$\Delta I_2 = 4(I_0 + MR^2) \tag{4'}$$

Where, $I_0$ denotes a moment of inertia of the inertia mass 10 itself.

As apparent from the equation (4'), the increment of the inertia moment $\Delta I$ is varied depending upon the radial distance R of each inertial mass from the center of the rotating shaft. Accordingly, the moment of inertia can be adjusted by varying the radial distance R of each inertial mass from the center of the rotating shaft. When the moment of inertia has to be slightly reduced, each inertial mass 10 will be coupled to a protrusion 7 disposed at a position more closer to the center of the rotating shaft. On the other hand, when the moment of inertia has to be slightly increased, each inertia mass 10 will be coupled to a protrusion 7 disposed at a position more farther from the center of the rotating shaft.

By optionally varying the moment of inertia of the rotating part of the drum in accordance with the present invention, it is possible to check the frame condition of the VCR varied depending upon the moment of inertia. In this regard, there is an advantage that the device of the present invention can be used as a tester for checking the effect caused by the variation of the inertia moment of the rotating part of the drum. The device of the present invention can compensate a tolerance of the inertia moment of the rotating part of the drum, which may be due to the possible variations of the manufacturing condition and the material of the parts in a mass production. As a result, a good frame condition can be obtained.

While a preferred embodiment of the invention has been described, such description is for illustrative purposes only, and it is to be understood that changes and modifications may be made without departing from the spirit or scope of the following claims.

What is claimed is:

1. A device for variably adjusting a moment of inertia of a drum of a videocassette recorder, said drum including upper and thereof to a motor, the device comprising:
    a disc-shaped plate fixedly mounted to a rotor of said motor and provided at the center portion thereof with a hole for receiving said rotating shaft;
    a plurality of protrusions radially arranged at concentric circles on said plate, said circles being spaced at different radial distances from the center of said rotating shaft, respecively;
    a plurality of inertial masses separably coupled to selected protrusions of said plate, respectively; and
    a plurality of springs each connecting adjacent inertial masses, whereby a moment of inertia of the drum can be variably adjusted depending upon the selective coupling of said inertial masses to selected protrusions of said plate.

* * * * *